(12) United States Patent
Chitrapu et al.

(10) Patent No.: US 7,657,288 B2
(45) Date of Patent: *Feb. 2, 2010

(54) SYSTEM AND METHOD UTILIZING DYNAMIC BEAM FORMING FOR WIRELESS COMMUNICATION SIGNALS

(75) Inventors: Prabhakar R. Chitrapu, Blue Bell, PA (US); Steven Jeffrey Goldberg, Downingtown, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 80 days.

This patent is subject to a terminal disclaimer.

(21) Appl. No.: 11/315,452

(22) Filed: Dec. 22, 2005

(65) Prior Publication Data

US 2006/0111149 A1  May 25, 2006

Related U.S. Application Data

(63) Continuation of application No. 10/305,595, filed on Nov. 27, 2002, now Pat. No. 6,999,795, and a continuation of application No. 10/305,740, filed on Nov. 27, 2002, now Pat. No. 7,016,702, and a continuation of application No. 10/305,821, filed on Nov. 27, 2002, now Pat. No. 6,993,361.

(60) Provisional application No. 60/334,309, filed on Nov. 29, 2001, provisional application No. 60/334,226, filed on Nov. 29, 2001, provisional application No. 60/334,369, filed on Nov. 29, 2001.

(51) Int. Cl.
*H04Q 7/20* (2006.01)
*H04M 1/00* (2006.01)
*H04B 7/00* (2006.01)

(52) U.S. Cl. .................... 455/562.1; 455/561; 455/524; 455/525

(58) Field of Classification Search .............. 455/456.1, 455/456.3, 457, 427, 562.1, 525, 524, 440, 455/561, 560; 342/357, 373
See application file for complete search history.

(56) References Cited

U.S. PATENT DOCUMENTS

| 5,596,329 A | | 1/1997 | Searle et al. |
| 5,596,333 A | * | 1/1997 | Bruckert .................... 342/457 |

(Continued)

FOREIGN PATENT DOCUMENTS

EP    0 639 035    2/1995

(Continued)

OTHER PUBLICATIONS

Third Generation Partnership Project, "Technical Specification Group Radio Access Network; Physical Layer—Measurements (FDD) (Release 1999)." 3GPP TS 25.215 V3.10.0 (Mar. 2002).
Third Generation Partnership Project, "Technical Specification Group Radio Access Network; Physical Layer—Measurements (FDD) (Release 1999)." 3GPP TS 25.215 V3.11.0 (Sep. 2002).
Third Generation Partnership Project, "Technical Specification Group Radio Access Network; Physical Layer—Measurements (FDD) (Release 5)." 3GPP TS 25.215 V 5.0.0 (Mar. 2002).
Third Generation Partnership Project, "Technical Specification Group Radio Access Network; Physical Layer—Measurements (FDD) (Release 5)." 3GPP TS 25.215 V 5.1.0 (Sep. 2002).

(Continued)

*Primary Examiner*—Tilahun B Gesesse
(74) *Attorney, Agent, or Firm*—Volpe and Koenig, P.C.

(57) ABSTRACT

The present invention relates to a method and system using dynamic beam forming for wireless communication signals in a wireless network. Base stations and/or UEs are provided with antenna systems having a range of beam forming selections. Relative base station and UE locations are one type of criteria used to make beam forming decisions.

9 Claims, 8 Drawing Sheets

U.S. PATENT DOCUMENTS

| | | | |
|---|---|---|---|
| 5,615,409 | A | 3/1997 | Forssen et al. |
| 5,842,130 | A | 11/1998 | Oprescu-Surcobe et al. |
| 5,893,033 | A * | 4/1999 | Keskitalo et al. ............ 455/437 |
| 6,094,165 | A * | 7/2000 | Smith .......................... 342/373 |
| 6,104,930 | A * | 8/2000 | Ward et al. .................. 455/450 |
| 6,104,935 | A * | 8/2000 | Smith et al. ............... 455/562.1 |
| 6,108,565 | A * | 8/2000 | Scherzer .................. 455/562.1 |
| 6,127,988 | A | 10/2000 | McNichol |
| 6,167,286 | A * | 12/2000 | Ward et al. ............... 455/562.1 |
| 6,219,561 | B1 | 4/2001 | Raleigh |
| 6,233,459 | B1 * | 5/2001 | Sullivan et al. ........... 455/456.2 |
| 6,233,466 | B1 | 5/2001 | Wong et al. |
| 6,353,601 | B1 * | 3/2002 | Siira .......................... 370/331 |
| 6,385,457 | B1 * | 5/2002 | Dam et al. ............... 455/456.2 |
| 6,404,386 | B1 * | 6/2002 | Proctor et al. ................ 342/368 |
| 6,484,031 | B1 * | 11/2002 | Ruutu et al. ............. 455/456.1 |
| 6,498,939 | B1 * | 12/2002 | Thomas .................... 455/562.1 |
| 6,593,880 | B2 * | 7/2003 | Velazquez et al. ........... 342/367 |
| 6,671,499 | B1 * | 12/2003 | Ylitalo et al. ............... 455/101 |
| 6,708,032 | B2 | 3/2004 | Willingham et al. |
| 6,754,512 | B1 | 6/2004 | Iimuna |
| 6,771,989 | B1 * | 8/2004 | Katz et al. ............... 455/562.1 |
| 6,804,522 | B2 * | 10/2004 | Lindskog et al. ............ 455/450 |
| 6,847,832 | B2 * | 1/2005 | Wong et al. .............. 455/562.1 |
| 6,850,761 | B2 * | 2/2005 | Pallonen ..................... 455/437 |
| 6,895,258 | B1 * | 5/2005 | Scherzer et al. .......... 455/562.1 |
| 6,907,269 | B2 * | 6/2005 | Yamaguchi et al. ......... 455/561 |
| 6,993,361 | B2 * | 1/2006 | Chitrapu ................... 455/562.1 |
| 6,999,795 | B2 * | 2/2006 | Chitrapu et al. .......... 455/562.1 |
| 7,016,702 | B2 * | 3/2006 | Chitrapu .................. 455/562.1 |
| 7,039,441 | B1 * | 5/2006 | Reudink et al. .......... 455/562.1 |
| 7,054,664 | B2 * | 5/2006 | Nagaraj .................... 455/562.1 |
| 7,072,692 | B1 * | 7/2006 | Katz et al. ............... 455/562.1 |
| 7,103,384 | B2 * | 9/2006 | Chun ....................... 455/562.1 |
| 7,333,835 | B2 * | 2/2008 | Nagaraj ................... 455/562.1 |
| 2002/0147032 | A1 | 10/2002 | Yoon et al. |
| 2003/0114195 | A1 | 6/2003 | Chitrapu et al. |
| 2003/0114196 | A1 | 6/2003 | Chitrapu |
| 2004/0198393 | A1 | 10/2004 | Hamada et al. |

FOREIGN PATENT DOCUMENTS

| | | |
|---|---|---|
| EP | 1 067 710 | 1/2001 |
| EP | 1 104 211 | 5/2001 |
| EP | 1 067 710 | 10/2001 |
| JP | 07-087011 | 3/1995 |
| JP | 13-127699 | 5/2001 |
| JP | 2001-128227 | 5/2001 |
| JP | 2001-168784 | 6/2001 |
| JP | 2001-169325 | 6/2001 |
| JP | 2001-203630 | 7/2001 |
| JP | 2001-268006 | 9/2001 |
| JP | 2001-320318 | 11/2001 |
| KR | 2000-49007 | 7/2000 |
| KR | 2000-62583 | 10/2000 |
| WO | 98/16077 | 4/1998 |
| WO | 99/54753 | 10/1999 |
| WO | 01/17311 | 3/2001 |

OTHER PUBLICATIONS

Third Generation Partnership Project, "Technical Specification Group Radio Access Network; UTRAN Iur interface Radio Network Subsystem Application Part (RNSAP) signaling (Release 1999)," 3GPP TS 25.423 V 3.9.0 (Mar. 2002).
Third Generation Partnership Project, "Technical Specification Group Radio Access Network; UTRAN Iur interface Radio Network Subsystem Application Part (RNSAP) signaling (Release 1999)," 3GPP TS 25.423 V 3.11.0 (Sep. 2002).
Third Generation Partnership Project, "Technical Specification Group Radio Access Network; UTRAN Iur interface Radio Network Subsystem Application Part (RNSAP) signaling (Release 4)," 3GPP TS 25.423 V 4.4.0 (Mar. 2002).
Third Generation Partnership Project, "Technical Specification Group Radio Access Network; UTRAN Iur interface Radio Network Subsystem Application Part (RNSAP) signaling (Release 4)," 3GPP TS 24.423 V 4.6.0 (Sep. 2002).
Third Generation Partnership Project, "Technical Specification Group Radio Access Network; UTRAN Iur interface Radio Network Subsystem Application Part (RNSAP) signaling (Release 5)," 3GPP TS 25.423 V 5.0.0 (Mar. 2002).
Third Generation Partnership Project, "Technical Specification Group Radio Access Network; UTRAN Iur interface Radio Network Subsystem Application Part (RNSAP) signaling (Release 5)," 3GPP TS 25.423 V 5.3.0 (Sep. 2002).
Third Generation Partnership Project, "Technical Specification Group Radio Access Network; UTRAN Iur interface user plane protocols for Common Transport Channel data streams (Release 1999)," 3GPP TS 25.425 V 3.7.0 (March 2002).
Third Generation Partnership Project, "Technical Specification Group Radio Access Network; UTRAN Iur interface user plane protocols for Common Transport Channel data streams (Release 4)," 3GPP TS 25.425 V 4.3.0 (Mar. 2002).
Third Generation Partnership Project, "Technical Specification Group Radio Access Network; UTRAN Iur interface user plane protocols for Common Transport Channel data streams (Release 5)," 3GPP TS 25.425 V 5.1.0 (Jun. 2002).
Third Generation Partnership Project, "Technical Specification Group Radio Access Network; UTRAN Iur interface user plane protocols for Common Transport Channel data streams (Release 5)," 3GPP TS 25.425 V 5.2.0 (Sep. 2002).
Third Generation Partnership Project, Technical Specification Group Radio Access Network; UTRAN Iub Interface NBAP Signalling (Release 1999), 3GPP TS 25.433 V 3.9.0 (Mar. 2002).
Third Generation Partnership Project, Technical Specification Group Radio Access Network; UTRAN Iub Interface NBAP Signalling (Release 1999), 3GPP TS 25.433 V 3.11.0 (Sep. 2002).
Third Generation Partnership Project, Technical Specification Group Radio Access Network; UTRAN Iub Interface NBAP Signalling (Release 4), 3GPP TS 25.433 V 4.4.0 (Mar. 2002).
Third Generation Partnership Project, Technical Specification Group Radio Access Network; UTRAN Iub Interface NBAP Signalling (Release 4), 3GPP TS 25.433 V 4.6.0 (Sep. 2002).
Third Generation Partnership Project, Technical Specification Group Radio Access Network; UTRAN Iub Interface NBAP Signalling (Release 5), 3GPP TS 25.433 V 5.0.0 (Mar. 2002).
Third Generation Partnership Project, Technical Specification Group Radio Access Network; UTRAN Iub Interface NBAP Signalling (Release 5), 3GPP TS 25.433 V 5.2.0 (Sep. 2002).
Third Generation Partnership Project, Technical Specification Group Radio Access Network; UTRAN Iub Interface User Plan Protocols for Common Transport Channel Data Streams (Release 1999), 3GPP TS 25.435 V 3.10.0 (Mar. 2002).
Third Generation Partnership Project, Technical Specification Group Radio Access Network; UTRAN Iub Interface User Plan Protocols for Common Transport Channel Data Streams (Release 4), 3GPP TS 25.435 V 4.4.0 (Mar. 2002).
Third Generation Partnership Project, Technical Specification Group Radio Access Network; UTRAN Iub Interface User Plan Protocols for Common Transport Channel Data Streams (Release 4), 3GPP TS 25.435 V 4.5.0 (Sep. 2002).
Third Generation Partnership Project, Technical Specification Group Radio Access Network; UTRAN Iub Interface User Plan Protocols for Common Transport Channel Data Streams (Release 5), 3GPP TS 25.435 V 5.1.0 (Jun. 2002).
Third Generation Partnership Project, Technical Specification Group Radio Access Network; UTRAN Iub Interface User Plan Protocols for Common Transport Channel Data Streams (Release 5), 3GPP TS 25.435 V 5.2.0 (Sep. 2002).
Third Generation Partnership Project, "Technical Specification Group Radio Access Network; Beamforming Enhancements (Release 5)," 3G TR 25.887 V1.0.0 (Dec. 2001).
US 6,385,601, 03/2002, Siira (withdrawn)

* cited by examiner

SYSTEM AND METHOD UTILIZING DYNAMIC BEAM FORMING FOR WIRELESS COMMUNICATION SIGNALS

CROSS REFERENCE TO RELATED APPLICATION(S)

This application is a continuation of co-pending U.S. application Ser. No. 10/305,595, filed Nov. 27, 2002 and claims priority from co-pending U.S. application Ser. No. 10/305,740, filed Nov. 27, 2002; co-pending U.S. application Ser. No. 10/305,821, filed Nov. 27, 2002 and U.S. provisional application No. 60/334,309, filed Nov. 29, 2001, U.S. provisional application No. 60/334,226, filed Nov. 29, 2001 and U.S. provisional application No. 60/334,369, filed Nov. 29, 2001, which are all incorporated by reference as if fully set forth.

FIELD OF INVENTION

The present invention relates to the field of wireless communications. More specifically, the present invention relates to a method and system using dynamic beam forming for wireless communication signal transmissions and/or receptions in a wireless network.

BACKGROUND

Wireless telecommunication systems are well known in the art. Conventionally, a base station will provide wireless communication for many subscriber units. Base stations will typically handle multiple communications with subscriber systems concurrently. One measure of base station capacity is the maximum number of concurrent communications it can support which is a factor determined by such things as available power and bandwidth.

Since not all subscribers communicate with the base station at the same time, a base station can provide wireless service to a great many subscribers beyond its capacity for concurrent communications. If the maximum number of concurrent communications for a base station are being conducted, an attempt to establish a further communication will result in an indication of service unavailability, such as a system busy signal.

Service coverage by a base station is not only limited to its capacity for handling concurrent communications, but is also inherently limited to a specific geographic area. A base station's geographic range is typically defined by the location of the base station's antenna system and the power of the signal broadcast by the base station.

In order to provide wireless service over an expansive geographic area, a network system is conventionally provided with multiple base stations. Each base station has its antenna system selectively physically located to provide coverage over a specific portion of the total geographic area which is covered by the system. Such systems readily provide wireless service for mobile subscriber units which can travel out of the range of one base station and into the range of another base station without interruption of an ongoing wireless communication. In such networks, the geographic area covered by a base station is commonly referred to as a cell and telephone communication services provide are commonly called cellular telephone services.

Systems constructed in accordance with current specifications of the 3$^{rd}$ Generation Partnership Program (3GPP) are designed to provide such service. In such systems, a typical transmitting base station is known as a "node b" and a typical subscriber unit, mobile or otherwise, is known as a User Equipment (UE).

Figure 1A:
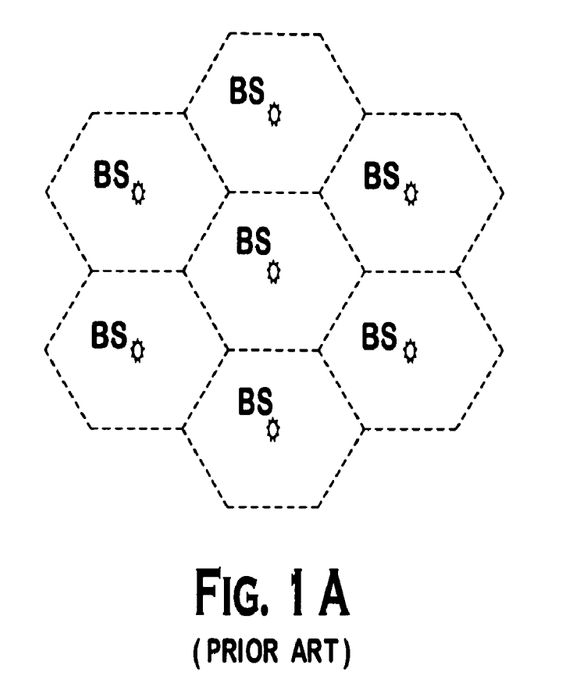
FIGS. 1A and 1B illustrate a conventional cell layout and transmission pattern.
Figure 1B:
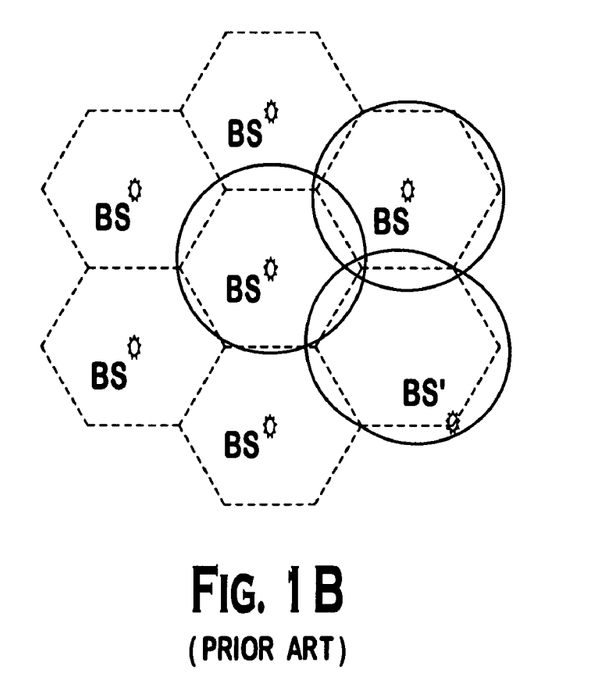

In designing a telecommunication system to cover a specific geographic area, the geographic area may be partitioned into a predefined pattern of cells. For example as illustrated in FIG. 1A, hexagonal-shape cells can be defined so that the cells cover the entire geographic area in a honeycomb pattern. In such a system, each cell can have a base station which has an antenna at the center of the cell to provide 360° coverage. Although a map of cell coverage may be designed without any overlapping areas, in practice as shown in FIG. 1B, the transmission beams, shown in phantom, from base station antennas of adjacent cells do overlap. This overlap of beam coverage enables "handover" of a communication being conducted by a mobile UE from one base station to another as the mobile UE travels from one cell to another. However, an overlapping base station signal contributes to interference of a signal received by a UE from a different base station when the UE is located in the overlap area.

For a variety of reasons, cells may be defined of various non-uniform shapes. Directional antennas, phased array antennas or other types of antenna systems can be provided so that a beam from a base station antenna for transmission and/or reception covers a particular geographic area of a specific shape and size. As illustrated by base station BS' in FIG. 1B, the use of directional antennas or phased antenna arrays enables a base station antenna to be located at the edge of a cell in order to provide a shaped beam covering the cell. This can have advantages in better utilization of power and avoidance of creating interference outside the cell, in contrast with merely placing a monopole antenna on the edge of a cell and transmitting a 360° communication beam.

Unlike wireless communication systems which only serve stationary subscriber units, systems designed to communicate with mobile users have much more complex usage patterns since service to a mobile UE can normally be provided by any base station within the system. Accordingly, a particular base station may find its capacity being fully utilized by mobile UEs entering its cell from other cells.

The inventors have recognized that the base station and associated antenna systems may be dynamically used to reconfigure base station transmission and/or reception beams in response to actual use of the wireless system. This can result in dynamically changing overall cell coverage to more readily meet service demands and, thus, better avoid attempted communications being met with a network busy signal. This can also result in "smart" handover to avoid communication degradation when a UE moves from one cell to another.

To implement dynamic beaming forming, the inventors have recognized that data generated by conventional means which identifies the geographic location of a mobile UE, such as using available Global Positioning Satellite (GPS) systems or a base station triangulation technique, can be advantageously used in the dynamic operation of base station antenna systems.

SUMMARY

A method of selectively directing base station RF communication signals in a wireless telecommunication system is provided. A base station conducts wireless RF communications with a plurality of user equipments (UEs). An estimated location of a UE is determined. Relative location data is then determined using the estimated UE location and a known location of a base station antenna system. Beam forming criteria is calculated based in part on the relative location data. A directed beam is formed for RF communication signals between the UE and the base station antenna system based on the calculated beam forming criteria such that the directed beam encompasses the estimated location of the UE.

The determining of location data of an estimated location of a UE may be performed by telecommunication system triangulation of UE transmitted signals received by one or more base stations. Alternatively, or in combination therewith, the determining of location data of an estimated location of a UE may be performed by the UE, such as by the UE using a Global Positioning Satellite system, and the data is transmitted from the UE to a base station.

The calculating beam forming criteria preferably includes calculating transmission beam forming criteria based in part on the relative location data. The beam forming preferably includes forming a directed transmission beam of base station RF communication signals transmitted from said base station antenna system based on the calculated transmission beam forming criteria such that the directed transmission beam encompasses the estimated location of the UE. Alternatively, or in addition, the calculating beam forming criteria may include calculating reception beam forming criteria based in part on the relative location data and the beam forming may include forming a directed reception beam for UE RF communication signals received by the base station antenna system based on the calculated reception beam forming criteria such that the directed reception beam encompasses the estimated location of the UE.

Preferably, an estimated location is determined for a plurality of UEs within a specified geographic range of the base station antenna system. Relative location data of each UE is then determined using the estimated UE location and the known location of the base station antenna system. Transmission beam forming criteria is calculated based in part on the determined relative location data of at least first and second UEs. A directed transmission beam of base station RF communication signals for the first UE based on the calculated transmission beam forming criteria is formed and transmitted from the base station antenna system such that the directed transmission beam encompasses the estimated location of the first UE. A directed transmission beam of base station RF communication signals for the second UE based on the calculated transmission beam forming criteria is formed and transmitted from the base station antenna system such that the directed transmission beam encompasses the estimated location of the second UE. One directed transmission beam of base station RF communication signals for both the first and second UEs may be formed and transmitted such that it encompasses the estimated locations of both the first UE and the second UE. Alternatively, a first directed transmission beam of base station RF communication signals for the first UE is formed and transmitted and a second directed transmission beam of base station RF communication signals for the second UE is formed and transmitted such that the second directed transmission beam has a different direction than the first directed transmission beam.

Preferably, the calculating transmission beam forming criteria is based in part on comparative signal to noise ratio (SNR) estimation. The signal to noise ratio (SNR) of forming one directed transmission beam of base station RF communication signals for both first and second UEs is preferably be estimated. The signal to noise ratio (SNR) of forming a first directed transmission beam of base station RF communication signals for the first UE and a second directed transmission beam of base station RF communication signals for said second UE that has a different direction than the first directed transmission beam is preferably estimated. Then the estimated SNRs are compared to determine if the calculated transmission beam forming criteria is to produce one or more directed transmission beams.

Preferably, a phased antenna array system is used as the base station antenna system and transmission beam forming criteria is calculated by estimating an area of beam coverage $A_{beam}$ as a function of RF phase $\phi$ and transmission power P such that phase $\phi$ and transmission power P are selected so the relative location of the UE is within $A_{beam}$. The relative location data of the UE can be given in the form ($\theta$, d), where $\theta$ represents the angle of the UE from a 0 degree reference of the base station antenna system and d represents the UE's distance from the base station antenna system location. The antenna system may have a plurality of modes M which provide different shapes of beams for the same phase and power and transmission beam forming criteria may then be calculated by estimating an area of beam coverage $A_{beam}$ as a function F of phase $\phi$, transmission power P and antenna system mode M. Preferably, the antenna system has at least two modes M which provide wide and narrow shapes of transmission beams, respectively for the same phase and power. The transmission beam forming criteria can be calculated by estimating a beam direction $\theta_{beam}$ as a function f of phase, $\theta_{beam}=f(\phi)$ so that $A_{beam}=F(f^{-1}(\theta_{beam}), P, M)$ and $\theta_{beam}$ is selected based on $\theta$ and P and M are selected base on d.

Where an estimated location is determined for a plurality of UEs, preferably reception beam forming criteria is calculated based in part on the determined relative location data of at least first and second of UEs. A directed reception beam for RF communication signals of the first UE received by the base station antenna system is formed based on the calculated reception beam forming criteria such that the directed reception beam encompasses the estimated location of the first UE. A directed reception beam for RF communication signals of the second UE received by the base station antenna system is formed based on the calculated reception beam forming criteria such that the directed reception beam encompasses the estimated location of said second UE. One directed reception beam for RF communication signals of both the first and second UEs may be formed such that it encompasses the estimated locations of the first UE and the second UE. Alternatively, a first directed reception beam for RF communication signals of the first UE is formed such that the first directed beam encompasses the estimated location of the first UE and a second directed reception beam for RF communication signals of the second UE is formed such that the second directed beam encompasses the estimated location of the second UE and has a different direction than the first directed reception beam.

Preferably, reception beam forming criteria calculation is based in part on comparative signal to noise ratio (SNR) estimation. Signal to noise ratio (SNR) of forming one directed reception beam for RF communication signals of both first and second UEs is estimated. Signal to noise ratio (SNR) of forming a first directed reception beam for RF communication signals of the first UE and a second directed reception beam for RF communication signals of the second UE that has a different direction than the first directed reception beam is estimated. The estimated SNRs are then compared to determine if the calculated reception beam forming criteria is to produce one or more directed reception beams.

Where a phased antenna array system is used as the base station antenna system, reception beam forming criteria is preferably calculated by estimating an area of beam coverage $A_{beam}$ as a function of RF phase $\phi$ such that phase $\phi$ is selected so the relative location data (θ, d) of the UE is within $A_{beam}$. Where the antenna system has a plurality of modes M which provide different shapes of beams for the same phase, reception beam forming criteria may be calculated by estimating an area of beam coverage $A_{beam}$ as a function F of phase φ and antenna system mode M. Reception beam forming criteria is preferably calculated by estimating a beam direction $θ_{beam}$ as a function f of phase, $θ_{beam}=f(φ)$ so that $A_{beam}=F(f^{-1}(θ_{beam}), M)$ and $θ_{beam}$ is selected based on θ and M is selected base on d.

A preferred base station has an RF module and an associated antenna array system. A beam former is operatively associated with the RF module to form a desired beam within a range of beams of which the antenna array system is capable. A geolocation processor is coupled to the beam former that is configured to process UE geolocation data relative to data of a location of the base station's antenna array system and output selected control parameters to the beam former. The beam former controls the RF module to transmit or receive communication data for a selected UE in a shaped beam that encompasses an estimated location of the selected UE where geolocation data which corresponds to the estimated location of the selected UE is processed by the geolocation processor. Preferably, the geolocation processor is configured to calculate transmission beam forming parameters by estimating an area of transmission beam coverage $A_{beam}$ as a function of RF phase φ and transmission power P such that phase φ and transmission power P are selected so the relative location data (θ, d) of the selected UE is within $A_{beam}$. Preferably, the antenna system has a plurality of modes M which provide different shapes of beams for the same phase and power and then the geolocation processor is configured to calculate transmission beam forming parameters as a function of phase φ, transmission power P and antenna system mode M and to output parameters to the beam former representing a selected combination of phase φ, transmission power P and antenna system mode M to control transmission beam formation.

Alternatively, or in addition, the geolocation processor is configured to calculate reception beam forming parameters by estimating an area of reception beam coverage as a function of RF phase such that phase is selected so the relative location data of the selected UE is within the area of reception beam coverage. Where the antenna system has a plurality of reception modes which provide different shapes of reception beams for the same phase, the geolocation processor is configured to calculate reception beam forming parameters as a function of phase and antenna system reception mode and to output parameters to the beam former representing a selected combination of phase and antenna system reception mode to control reception beam formation.

Preferably, the RF module has the capacity to provide more than one transmission beam such that each transmission beam is capable of carrying communication signals for a separate set of UEs. In such case, the beam former is operatively associated with the RF module to form a set of desired transmission beams within a range of transmission beams which the antenna array system is capable of producing. The geolocation processor is then configured to calculate transmission beam forming parameters by estimating a set of areas of transmission beam coverage based on relative location data ($θ_i$, $d_i$) of each $UE_i$ of a plurality of selected UEs, where $θ_i$ represents the angle of the $UE_i$ from a 0 degree reference of the base station antenna system and $d_i$ represents the distance of the $UE_i$ from the base station antenna system location, as a function of RF phase φ and transmission power P such that phase φ and transmission power P are selected so the relative location data ($θ_i$, $d_i$) of each $UE_i$ of a plurality of selected UEs, is within one area of the set of areas of transmission beam coverage. Where the antenna system has a plurality of modes M which provide different shapes of beams for the same phase and power, the geolocation processor is preferably configured to calculate transmission beam forming parameters as a function of phase φ, transmission power P and antenna system mode M and to output parameters to the beam former representing a set of selected combination of phase φ, transmission power P and antenna system mode M to control transmission beam formation.

Alternatively, or in addition, the RF module has the capacity to provide more than one reception beam such that each reception beam is capable of carrying communication signals for a separate set of UEs. In such case, the beam former is operatively associated with the RF module to form a set of desired reception beams within a range of reception beam capacity of the antenna array system. The geolocation processor is then configured to calculate reception beam forming parameters by estimating a set of areas of reception beam coverage based on relative location data ($θ_i$, $d_i$) of each $UE_i$ of a plurality of selected UEs, where $θ_i$ represents the angle of the $UE_i$ from a 0 degree reference of the base station antenna system and $d_i$ represents the distance of the $UE_i$ from the base station antenna system location, as a function of RF phase φ such that phase φ is selected so the relative location data ($θ_i$, $d_i$) of each $UE_i$ of a plurality of selected UEs, is within one area of the set of areas of reception beam coverage. Where the antenna system has a plurality of modes M which provide different shapes of beams for the same phase, the geolocation processor is preferably configured to calculate reception beam forming parameters as a function of phase φ and antenna system mode M and to output parameters to the beam former representing a set of selected combination of phase φ and antenna system mode M to control reception beam formation.

A wireless telecommunication system is constructed by providing a plurality of such base stations and a plurality of mobile user equipments (UEs). Preferably, each UE includes an RF module that has an associated antenna. The UEs may have a geolocation processor that is configured to determine current UE geolocation data using a global positioning satellite (GPS) system which data is transmitted from the UE RF module antenna for use by the base stations. Each UE may include a beam former operatively associated with the UE RF module to form a desired beam within a range of beams which the UE antenna array system is capable of producing. In such case, a geolocation processor is coupled to the UE beam former that is configured to process UE geolocation data of an estimated UE location relative to data of the known location of a selected base station and output selected control parameters to the beam former. The UE beam former controls the UE RF module to transmit or receive communication data for the selected base station in a shaped beam that encompasses the known location of the selected base station where UE geolocation data relative to the known location of the selected base station is processed by the UE geolocation processor.

The UE geolocation processor is preferably configured to calculate transmission beam forming parameters by estimating an area of transmission beam coverage $A_{beam}$ as a function of RF phase φ and transmission power P such that phase φ and transmission power P are selected so relative location data of the estimated UE location relative to the known location of the selected base station is within $A_{beam}$. Relative location data of the estimated UE location relative to the known location of the selected base station can be represented as (θ, d), where θ represents the angle of the selected base station from a 0 degree reference of the estimated UE location and d represents the distance between the estimated UE location and the known location of the selected base station.

The UE antenna system may have a plurality of modes M which provide different shapes of beams for the same phase and power. In such case, the UE geolocation processor is preferably configured to calculate transmission beam forming parameters as a function of phase $\phi$, transmission power P and antenna system mode M and to output parameters to the beam former representing a selected combination of phase $\phi$, transmission power P and antenna system mode M to control transmission beam formation.

The UE geolocation processor may be configured to calculate reception beam forming parameters by estimating an area of reception beam coverage as a function of RF phase such that phase is selected so the relative location data of the selected base station is within the area of reception beam coverage. Where the antenna system has a plurality of reception modes which provide different shapes of reception beams for the same phase, the geolocation processor is preferably configured to calculate reception beam forming parameters as a function of phase and antenna system reception mode and to output parameters to the beam former representing a selected combination of phase and antenna system reception mode to control reception beam formation.

Another aspect of the invention provides a method of selectively directing base station RF communication signals in a wireless telecommunication system wherein base stations which have overlapping transmission ranges conduct wireless RF communications with a plurality of user equipments (UEs). An estimated location of each of a plurality of UEs that are to receive base station RF communication signals is determined. The determining of an estimated location of a UE is preferably performed by telecommunication system triangulation of UE transmitted signals received by one or more base stations and/or performed by a Global Positioning Satellite system at the UE. For each UE, each base station that has a transmission range which encompasses the estimated UE location is identified. For each UE, relative UE location data in relation to each identified base station is identified using the UE location data and predefined location data of the identified base station. For each identified base station, beam forming criteria is calculated based in part on the determined relative location data such that each UE is assigned to a particular base station from which RF communication signals for that UE are to be transmitted. A set of directed beams of base station RF communication signals for the UEs is formed based on the calculated beam forming criteria such that for each said UE a directed beam having RF communication signals for that UE encompasses the estimated location of that UE. The process is repeated based on selected criteria to dynamically reconfigure base station transmission beams.

Communication data for each UE may have a quality of service and a data rate requirement. In such case, beam forming criteria is preferably calculated such that each UE is assigned to a particular base station based in part on the quality of service and data rate requirements of the communication data to be transmitted to the UEs. Preferably, the relative location data of each UE includes estimated relative velocity data of the UE. In such case, beam forming criteria is preferably calculated such that each UE is assigned to a particular base station based in part on both the relative location data corresponding to the estimated UE locations and the relative estimated velocity data of the UEs.

The method to dynamically reconfigure base station transmission beams is preferably repeated based on a selected type of:
a. change in relative location data corresponding to the estimated UE locations and the relative estimated velocity data of the UEs,
b. change in the quality of service and/or data rate requirements of the communication data to be transmitted to the UEs, and/or
c. base station failure.

A preferred wireless telecommunication system to dynamically reconfigure base station transmission beams includes a plurality of base stations for conducting wireless RF communications with a plurality of user equipments (UEs). Each base station has an RF module and an associated antenna system that is located at a predetermined position and a geographic transmission range that overlaps with the transmission range of at least one other of said base stations. A beam former operatively associated with the RF module of each base station to form a set of desired beams within a range of beams which the base station's antenna array system is capable of producing. A network interface interconnects the base stations. The network interface and one or more associated geolocation processors are configured to:
a. process UE geolocation data that corresponds to estimated locations of selected UEs relative to location data of antenna array systems of base stations having transmission ranges that encompass the estimated locations of the selected UEs,
b. apportion said selected UEs into groups, each group for maintaining communications with a selected base station of base stations having transmission ranges that encompass the estimated locations of the selected UEs, and
c. output selected parameters to the beam formers of base stations having transmission ranges that encompass the estimated locations such that a selected base station transmits communication data for each UE of the corresponding group of apportioned UEs in a shaped beam that encompasses the estimated location of the respective UE.

Communication data for each selected UE may have a quality of service and a data rate requirement. Preferably, the network interface and associated geolocation processors are configured to apportion the selected UEs into groups based in part on the quality of service and data rate requirements of the communication data to be transmitted to the selected UE. Geolocation data of each selected UE may include estimated relative velocity data of the UE. Preferably, the network interface and associated geolocation processors are configured to apportion the selected UEs into groups based in part on both the geolocation data corresponding to the estimated UE locations and relative estimate velocity data of the selected UEs.

Preferably, each base station includes a geolocation processor coupled to its beam former that is configured to process UE geolocation data relative to the predetermined position of its antenna array system to output selected parameters to its beam former such that its beam former controls its RF module to transmit communication data for a selected UE in a shaped beam that encompasses an estimated location of the selected UE where geolocation data which corresponds to the estimated location is processed by said geolocation processor. Where communication data for a UE has a quality of service and a data rate requirement, each base station geolocation processor is preferably configured to calculate beam forming parameters for a beam directed to a selected UE based in part on the quality of service and data rate requirements of the communication data to be transmitted to the selected UE. Where geolocation data of each selected UE includes estimated relative velocity data of the UE, each base station geolocation processor is preferably configured to calculate beam forming parameters for a beam directed to a selected UE based in part on both the geolocation data corresponding to the estimated locations and relative estimate velocity data of the selected UE.

Additionally, each base station geolocation processor may be configured to output selected parameters to the base station's beam former such that the base station's beam former controls the RF module to transmit or receive communication data for a selected UE in a shaped beam that encompasses an estimated location of the selected UE where geolocation data which corresponds to the estimated location of the selected UE is processed by said geolocation processor. Each base station RF module can have the capacity to provide more than one transmission or reception beam such that each transmission or reception beam is capable of carrying communication signals for a separate set of UEs. In such case, each respective beam former is operatively associated with the RF module to form a set of desired transmission or reception beams within a range of beams within the capacity of the base station's antenna array system.

A further aspect of the invention provides a smart handover method of selectively directing base station RF communication signals in a wireless telecommunication system wherein base stations that have known locations and overlapping transmission ranges conduct wireless RF communications with a mobile user equipment (UE). An estimated location of a mobile UE which is receiving RF communication signals from a base station and is located in the transmission range of a plurality of base stations is determined. The determining of an estimated location of a UE is preferably performed by telecommunication system triangulation of UE transmitted signals received by one or more base stations and/or performed by a Global Positioning Satellite system at the UE. For each UE, each base station that has a transmission range which encompasses the estimated UE location is identified. Each base station that has a transmission range which encompasses the estimated UE location is identified. Relative UE location data in relation to each identified base station is determined using the estimated UE location and the base station's known location. Beam forming criteria is calculated based in part on the determined relative location data such that the UE is assigned to one of the identified base stations from which RF communication signals for that UE are to be transmitted. A directed beam of base station RF communication signals for the UE transmitted from the assigned base station is formed based on the calculated beam forming criteria such that the directed beam encompasses the estimated location of that UE. The smart handover process is repeated based on selected criteria to dynamically reconfigure base station transmission beams.

Communication data for the UE may have a quality of service and a data rate requirement. In such case, beam forming criteria such that the UE is assigned to one of the identified base stations is preferably calculated based in part on the quality of service and data rate requirements of the communication data to be transmitted to the UEs. Relative location data of the UE may include estimated relative velocity data of the UE. In such case, beam forming criteria such that each UE is assigned to one of said identified base stations is preferably calculated based in part on both the relative location data corresponding to the estimated UE location and the relative estimated velocity data of the UE.

The smart handover process is preferably repeated to dynamically reconfigure base station transmission beams based on a selected type of:
    a. change in relative location data corresponding to the estimated UE location and the relative estimated velocity data of the UE,
    b. change in the quality of service and/or data rate requirements of the communication data to be transmitted to the UE, and/or
    c. base station failure.

A preferred wireless telecommunication system for implementing smart handover includes a plurality of base stations for conducting wireless RF communications with a mobile user equipment (UE). Each base station has an RF module and an associated antenna system that is located at a predetermined position and a geographic transmission range which overlaps with the transmission range of at least one other of the base stations. A beam former operatively associated with the RF module of each base station to form a set of desired beams within a range of beams which the base station's antenna array system is capable of producing. A network interface interconnects the base stations. The network interface and one or more associated geolocation processors configured to:
    a. process UE geolocation data that corresponds to an estimated location of a selected mobile UE relative to location data of antenna array systems of base stations having transmission ranges that encompass the estimated location of the selected UE;
    b. select a base station of the base stations having transmission ranges that encompass the estimated location of the selected UE; and
    c. output parameters to the beam former of the selected base station such that the selected base station transmits communication data for the selected UE in a shaped beam that encompasses the estimated location of the selected UE.

Communication data for the selected UE may have a quality of service and a data rate requirement. In such case, the network interface and associated geolocation processors are preferably configured to select a base station based in part on the quality of service and data rate requirements of the communication data to be transmitted to the selected UE. Geolocation data of the selected UE may include estimated relative velocity data of the UE. In such case, the network interface and associated geolocation processors are configured to select a base station based in part on both the geolocation data corresponding to the estimated location and relative estimate velocity data of the selected UE.

Each base station may include a geolocation processor coupled to its beam former that is configured to process UE geolocation data relative to the predetermined position of its antenna array system to output selected parameters to its beam former such that its beam former controls its RF module to transmit communication data for a selected UE in a shaped beam that encompasses an estimated location of the selected UE where geolocation data which corresponds to the estimated location is processed by said geolocation processor. Where communication data for a UE has a quality of service and a data rate requirement, each base station geolocation processor is preferably configured to calculate beam forming parameters for a beam directed to a selected UE based in part on the quality of service and data rate requirements of the communication data to be transmitted to the selected UE. Where geolocation data of the UE includes estimated relative velocity data of the UE, each base station geolocation processor is preferably configured to calculate beam forming parameters for a beam directed to the UE based in part on both the geolocation data corresponding to the estimated location and relative estimate velocity data of the UE.

Each base station geolocation processor may also be configured to calculate transmission beam forming parameters by estimating an area of transmission beam coverage $A_{beam}$ as a function of RF phase $\phi$ and transmission power P such that phase $\phi$ and transmission power P are selected so the relative location data of the UE is within $A_{beam}$. Wherein each base station antenna system has a plurality of modes M which provide different shapes of beams for the same phase and power, each base station geolocation processor is preferably configured to calculate transmission beam forming parameters as a function of phase $\phi$, transmission power P and antenna system mode M and to output parameters to the respective beam former representing a selected combination of phase $\phi$, transmission power P and antenna system mode M to control transmission beam formation.

Each base station geolocation processor may also be configured to output selected parameters to the base station's beam former such that the base station's beam former controls the RF module to transmit or receive communication data for the UE in a shaped beam that encompasses an estimated location of the UE where geolocation data which corresponds to the estimated location of the UE is processed by said geolocation processor. In such case, each base station geolocation processor is preferably configured to calculate reception beam forming parameters by estimating an area of reception beam coverage as a function of RF phase such that phase is selected so the relative location data of the UE is within the area of reception beam coverage. Wherein each base station antenna system has a plurality of reception modes which provide different shapes of reception beams for the same phase, the geolocation processor is preferably configured to calculate reception beam forming parameters as a function of phase and antenna system reception mode and to output parameters to the beam former representing a selected combination of phase and antenna system reception mode to control reception beam formation.

Each base station RF module may have the capacity to provide more than one transmission beam such that each transmission beam is capable of carrying communication signals for a separate set of UEs. In such case, each respective beam former is preferably operatively associated with the RF module to form a set of desired transmission beams within a range of transmission beams which the base station's antenna array system is capable of producing.

In any of the disclosed systems, each UE preferably includes an RF module that has an associated antenna. Each UE may have a geolocation processor that is configured to determine current UE geolocation using a global positioning satellite (GPS) system. Optionally, each UE may also include a beam former operatively associated with the UE RF module to form a desired beam within a range of beams which the antenna array system is capable of producing and a geolocation processor coupled to the UE beam former that is configured to process UE geolocation data of an estimated UE location relative to data of the known location of a selected base station and output selected parameters to the beam former such that the beam former controls the RF module to transmit or receive communication data for the selected base station in a shaped beam that encompasses the known location of the selected base station where UE geolocation data relative to the known location of the selected base station is processed by the UE geolocation processor.

Other object and advantages of the present invention will be apparent to the skilled artisan from the following detailed description.

DETAILED DESCRIPTION OF THE PREFERRED EMBODIMENT(S)

Initial cell coverage for a wireless communication system can be configured in a conventional manner such as illustrated in FIG. 1B. However, in lieu of maintaining strictly defined coverage areas, the present invention employs dynamic shaping of cell coverage to adapt to actual real time system usage demands. Radio resources, coverage area and users served can be better shared among a number of neighboring and cooperating base stations. This leads to increased system capacity, utilization and efficiency.

The following description is primarily directed to dynamic shaping of transmission beams from base stations. However, those of ordinary skill in the art will appreciate the applicability of beam forming for reception as well. Since the data requirements in various types of bidirectional communications can be quite different for uplink and downlink portions of the same communication, independent control of beam shaping for transmission and reception is preferred. Additionally, beam forming for transmission or reception at UEs can also be advantageously employed.

Preferably, the base station for each cell employs a phased antenna array or similar antenna system. As is well known in the art, phased antenna arrays and other conventional systems can enable a base station to transmit (or receive) a selectively sized beam in a selected direction. For a phased antenna array, an RF signal phase can be adjusted to direct the transmission beam and signal power can be adjusted to control the size of the beam. Also, antenna selection and size can play a role in shape and size of the beam. For example, a base station can have an antenna system with two antenna arrays, one which produces relatively narrow beams in a given direction and one that produces relatively wide beam in a given direction.

Through adjusting such parameters, two or more neighboring cells can negotiate and redefine the area covered by each base station in a manner that is more optimal to all of the cells taken together. A base station may initiate a negotiation process with one or more of its neighbors in adjacent cells as a result of excessive demand from users in area presently covered by it or as a result of surplus resources rendered by low traffic volume. In addition to the above, there may be other considerations that could make a cell initiate a negotiation process. The negotiation process itself preferably entails of a series of message exchanges between the cooperating base stations using interfaces between themselves. At the end of the negotiation process, the group of cells may arrive at a new partitioning of the total area covered, thereby improving the collective operational performance. The new area covered by each base station is illuminated with RF energy by beam forming techniques of the antenna arrays.

Figure 2:
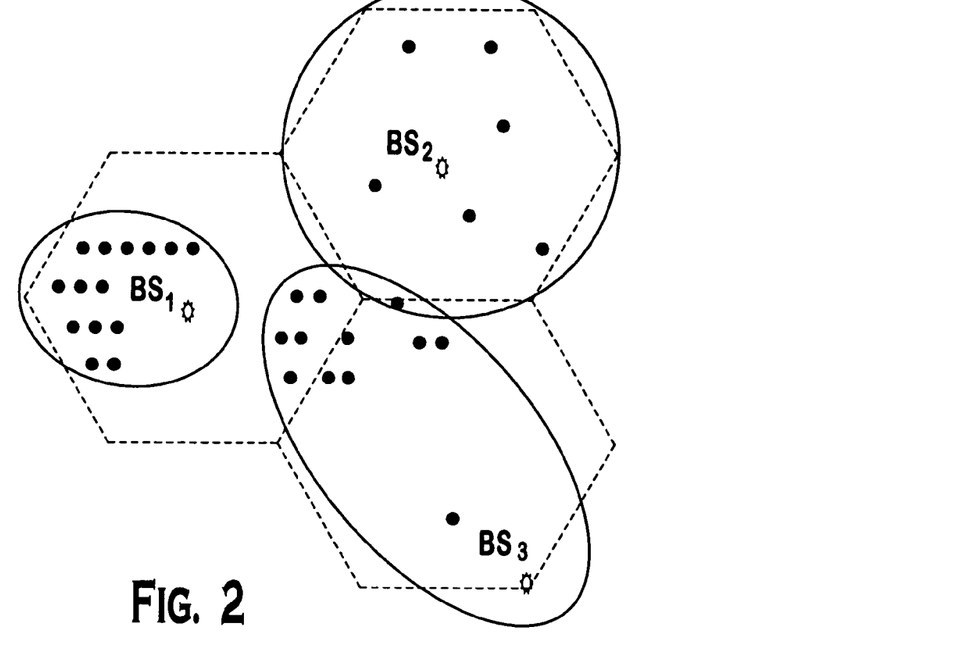
FIG. 2 illustrates the dynamic use of shaped transmission beams to address a specific concentration of users.
Figure 3:
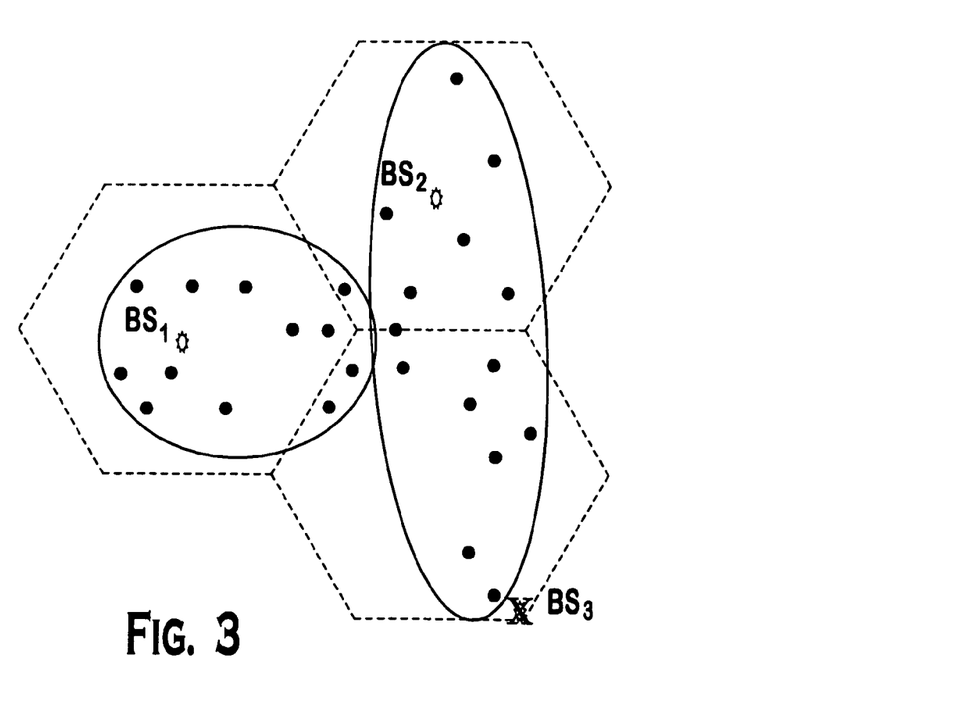
FIG. 3 illustrates the dynamic use of shaped transmission beams where a base station suffers a failure.

FIGS. 2 and 3 depict examples of scenarios. FIG. 2 illustrates a concentration of users in the base station $BS_1$ region and the region between base station $BS_1$ and base station $BS_3$. Upon determining the high concentration of users in these regions, the antenna arrays at base station $BS_1$ and base station $BS_3$ are used to transmit a selectively shaped and directed beam to provide the needed radio resources to the user concentrations. FIG. 3 shows a situation where base station $BS_3$ has suffered a failure. Base station $BS_1$ and base station $BS_2$ are then used to transmit a selectively shaped and directed beam to provide the needed radio resources to the users in the region normally served by base station $BS_3$.

Figure 4:
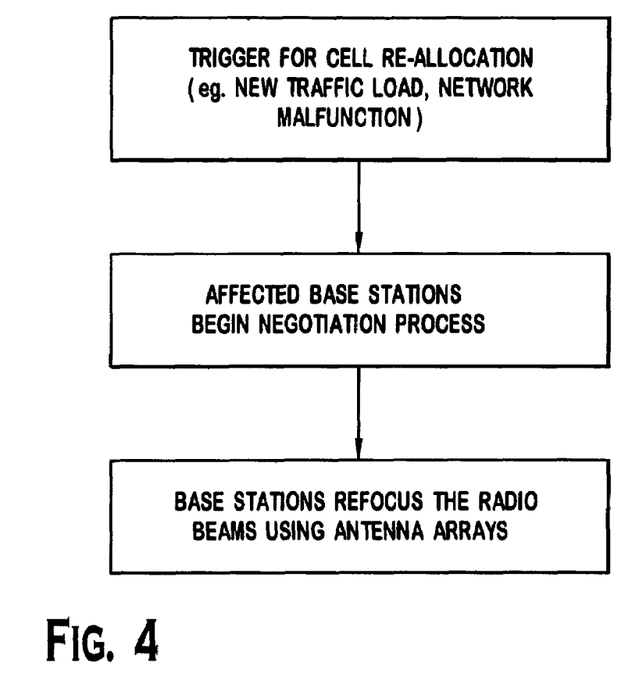
FIG. 4 is a flow chart for the dynamic reallocation of cell coverage.

FIG. 4 is a flow chart depicting the typical sequence of steps involved in dynamically re-allocating base station coverage using antenna arrays. First, parameters are set for triggering the reallocation. In order to track and determine triggering events, the network preferably keeps track of the number of active communications between each base station and the UEs and the UE location. Preferably, this information is updated at a rapid rate, since mobile UE locations may be continuously changing.

In addition to the location of the UE(s), the speed and direction of the UE(s) may also be reported by the UE or estimated by the BS. This information, coupled with geographic map information, may be used to predict the future position(s) of the UE(s). This information can be used to (1) reduce the frequency with which the location data has to be transmitted by the UE(s) to the BS, (2) determine if the network is likely to reach full capacity in (near) future. The latter can be taken into account in the beam forming decision process.

This data enables the network to determine if a particular base station is reaching full capacity or is likely to reach full capacity. The reallocation process can then be triggered when a threshold number of concurrent user communications with a particular base station or a threshold amount of data traffic volume is reached. The number of on going communications in adjacent cells is compared and if there is a sufficiently lower number, the negotiation process between two or more base stations commences. Since UE location is known, a significantly high concentration of users in a small area can also be used as a triggering event. Preferably, a base station failure is also defined as a triggering event to provide auxiliary coverage by adjacent base stations.

The negotiation process, after being initiated by a triggering event, preferably entails evaluating all of the UE location data for UEs communicating with the particular base stations and matching them with a set of beam patterns available to the particular base stations which provide a more even service distribution of the UEs with the same or lower signal to noise ratio (SNR). Once the negotiation process is completed, the base stations refocus their transmitted RF signals to provide the beams for the UEs which are determined during the negotiation process.

Beam forming selection is preferably determined using UE geolocation data. Data traffic volume is also an important consideration, particularly when beam forming is applied for communication with multiple UEs.

Figure 5A:
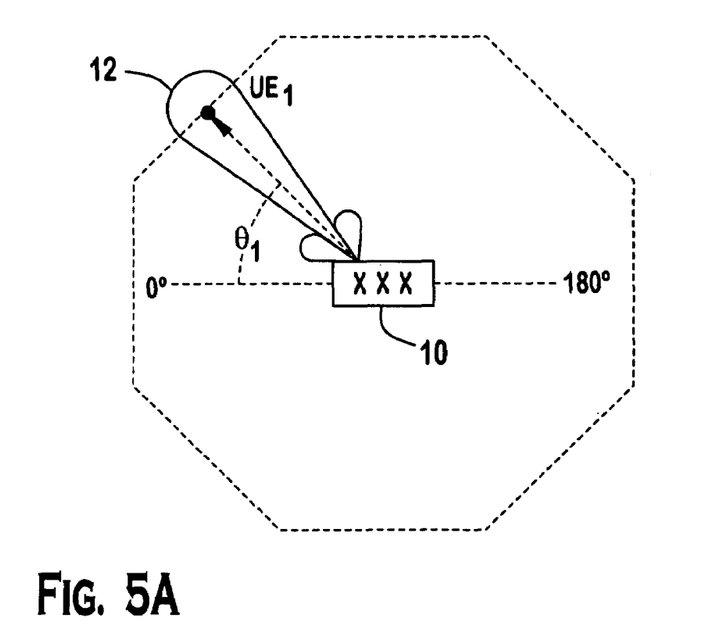
FIGS. 5A-5E illustrate a base station using beam forming to provide radio beam coverage to selected User Equipments (UEs) in a variety of situations.

FIG. 5A illustrates an elemental case where a base station 10 focuses a radio beam 12 on a single UE, $UE_1$. The base station beam is formed using explicit knowledge of location and/or locations of the targeted users, in this case $UE_1$.

Figure 6:
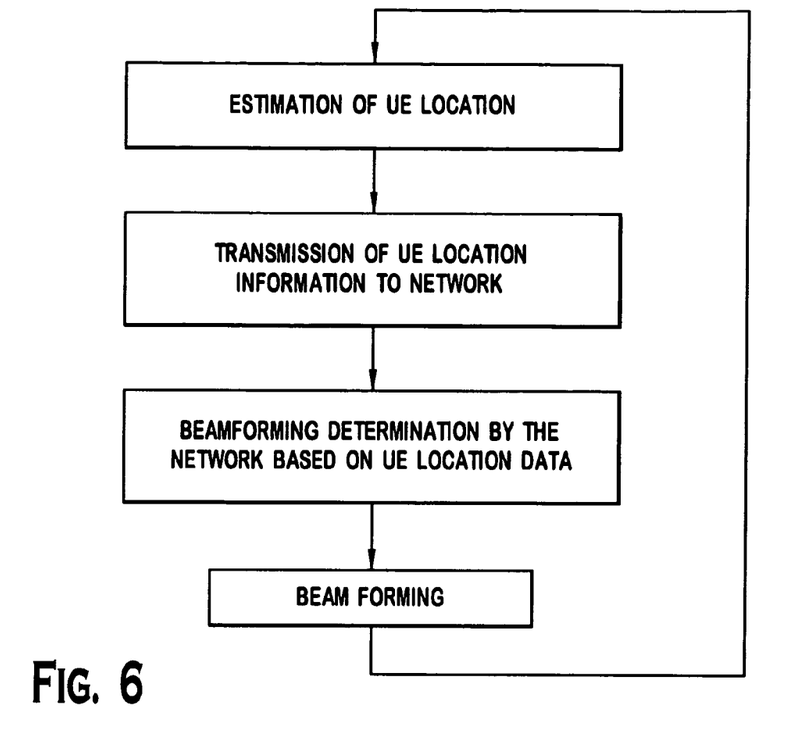
FIG. 6 is a flow chart for implementing geolocation based beam forming.

FIG. 6 provides an elementary flow diagram of the process. The first step consists of determination of location and/or locations of the targeted UE and/or UEs. This is preferably achieved by using well known techniques including: 1) UE based techniques, such as GPS based methods; 2) Network based triangulation methods, such as methods based on Time Difference of Arrival (TDOA), Angle of Arrival (AOA); 3) hybrid methods involving both the UE and the Network. When using a UE based technique, a second communication step is provided by which the Network is made aware of locations data for each targeted UE. This process consists of an exchange of appropriately designed messages between UE and the Network.

A beam forming calculation step then occurs which preferably includes decision processing based on location data of targeted UEs. During this step the network determines the characteristics of the beam forming in order to serve the targeted UE(s) in a manner deemed appropriate and/or optimal by the network. This decision process may also involve a bidirectional communication process, in which the UE is also involved in the decision process. Finally, the beam is formed based on decision process to produce a selectively sized and directed RF beam which covers the UE's position as reflected by its geolocation data.

Figure 7:
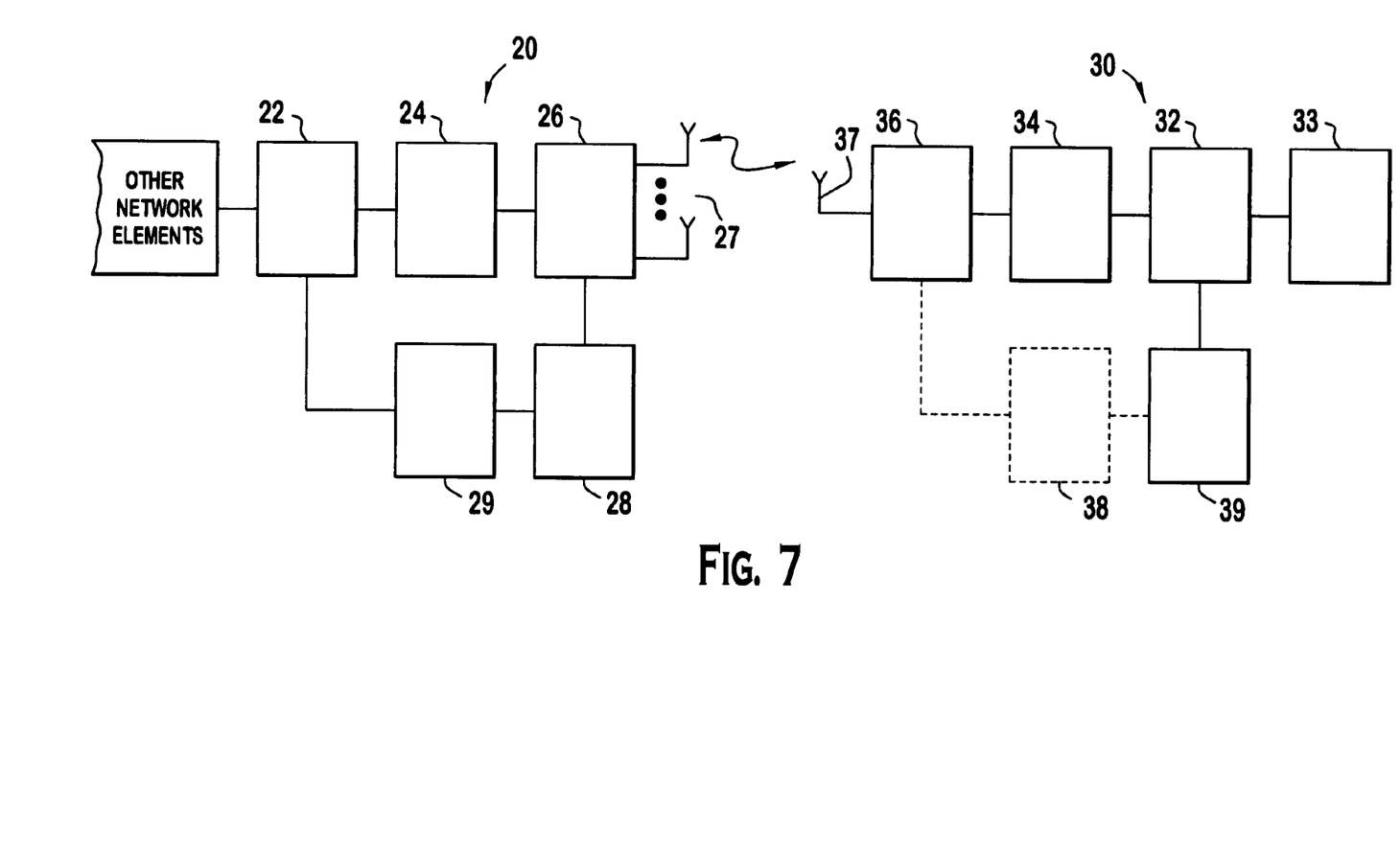
FIG. 7 is a block diagram of base station and UE components for a geolocation-assisted beam forming mobile communication system in accordance with the teachings of the present invention.

A block diagram of relevant components of a base station 20 and a UE 30 is illustrated in FIG. 7. The base station 20 is preferably coupled to network components via a set of channel processors 22 that process and format data. The base station/network interface may be by wireline, wireless or any other type of connection.

The channel processors 32 are coupled with a set of modem units 24. The modem units 24 modulate signals for transmission and demodulate received signals. An RF module 26 has an associated phased antenna array system 27 and is coupled with the modems 24. The RF module 26 translates the modulated signals received from the base station modem units 24 to a selected carrier frequency for transmission. The RF module 26 is operatively associated with a beam former 28 that can selectively adjust power, RF phase and antenna selection to form a desired beam from the range of beams which the antenna array system 27 is capable of producing. A geolocation processor 29 processes the UE geolocation data to output selected parameters to the beam former 28.

The antenna system 27 can have a continuous range of angularly oriented beams or a range of discrete angularly oriented beams. The beam range may also have various beam widths available for particular angular orientations. Preferably, the RF module 26 is configured so that it is capable of providing more than one transmission beam such that each beam is capable of carrying communication signals for a separate set of UEs. Preferably, beam forming for reception is independent of beam forming for transmission, since the data flow of user communications is often asymmetric. For example, if the UE has requested a data link to download a file, the downlink data to the UE will be normally significantly greater than any uplink data flow to the base station during such a communication.

The UE 30 includes a channel processor 32 for processing and formatting data that is coupled with a modem unit 34. An application processor 33 can be provided to support various voice and data processing applications. The modem unit 34 modulates signals for transmission and demodulates received signals. An RF module 36 has an associated antenna 37 and is coupled with the modem 34. The RF module 36 translates the modulated signal received from the UE modem 34 to a selected carrier frequency for transmission. A geolocation processor 39 can be provided to determine UE geolocation from a GPS system that is then transmitted to the base station 20, preferably at frequent intervals for a mobile UE.

The UE may be provided with a beam former 38 (shown in phantom) that can selectively adjust power, RF phase and antenna selection to form a desired beam from the range of beams which the antenna array system 37 is capable of producing. In such case, the geolocation processor 39 is provided to process the UE geolocation data to output selected parameters to the UE's beam former. Using beam forming for UE transmission and/or reception can provide benefits in SNR reduction both at the UE and for the network. Transmitting a directed beam will in many instances reduce the amount of interference created by the UE to other system base stations or UEs outside the beam. Receiving via a directed beam will in many instances decrease the amount of interference in the received signal for sources outside the beam.

For convenience, the geolocation data for each UE can be stated in terms of polar coordinates relative to the base station antenna position of the base station from which a beam is to be transmitted to the UE. With reference to FIG. 5A, in operation, the base station receives the location data of $UE_1$ as $(\theta_1, d_1)$ where $\theta_1$ represents the angle of the UE from a 0 degree reference ray of the base station antenna system and $d_1$ represents the UE's estimated distance from the base station antenna system location.

Where dynamic beam forming is employed by the UE, geolocation data for the UE can similarly be stated in terms of polar coordinates relative to a known location of a selected base station with which the UE is communicating. In such case, the relative location data coordinate 0 represents the angle of the selected base station from a 0 degree reference ray of the UE and d represents the UE's estimated distance from the selected base station.

Where a phased antenna array system is employed, the beam coverage area $A_{beam}$ is a function F( ) of RF phase $\phi$ and, for transmitted beams, transmission power P. The specific antenna system employed may also provide various antenna selection modes M which provide different shapes of beams for the same phase and power, for example a wide beam and a narrow beam selection may be available for a give phase. Accordingly, in general:

$A_{beam} = F(\phi, P, M)$ (for transmission)

$A_{beam} = F(\phi, M)$ (for reception).

Since beam direction $\theta_{beam}$ is a primarily a function of phase, $\theta_{beam} = f(\phi)$:

$A_{beam} = F(f^{-1}(\theta_{beam}), P, M)$ (for transmission)

$A_{beam} = F(f^{-1}(\theta_{beam}), M)$ (for reception).

Applying this in FIG. 5A to provide a transmission beam 12 to cover $UE_1$, $A_{beam12} = F(f^{-1}(\theta_1), P, M)$ where P, M are selected such that $A_{beam12}$ extends at least a distance of $d_1$.

Phased array antennas that have bidirectional beams may be used. Typically, such antennas direct beams which are symmetric to an axis. By defining the antennas angular 0 degree reference along that axis, the functional relationship of the beam direction $\theta_{beam}$ to phase $\phi$ can be represented in terms of its absolute value as:

$|\theta_{beam}| = f(\phi)$ where the polar coordinate representations of UE location data are converted such that the angular data $\theta$ ranges ±180 degrees from the base stations' 0 degree angular reference, i.e. $-180° \leq \theta \leq 180°$.

A primary factor in selecting beam forming parameters, particularly P and M, is to maintain an adequate signal to noise (interference) ratio (SNR) of the received signal. In Capacity or Coverage limited systems, the goal is usually to obtain the highest SNR possible. In interference limited systems such as CDMA, the goal is to meet some minimum SNR to guarantee a satisfactory QoS for the needs of the link, but not much higher so that unnecessary interference to other links is not induced. SNR is S÷I, where S is desired Signal and I is the interference. A general formula is:

$$\frac{S}{I} = \frac{S_b}{N_0 + \sum S_k},$$

Where:
$S_b$ is the desired signal at the receiver,
$N_0$ is the noise, and
$\Sigma S_k$ is the sum of signal interference from other communications.

The nature of the $S_k$ values are generally dependant on the modulation in use, with an inverse relationship to distance.

Figures 5B, 5C, 5D, 5E:
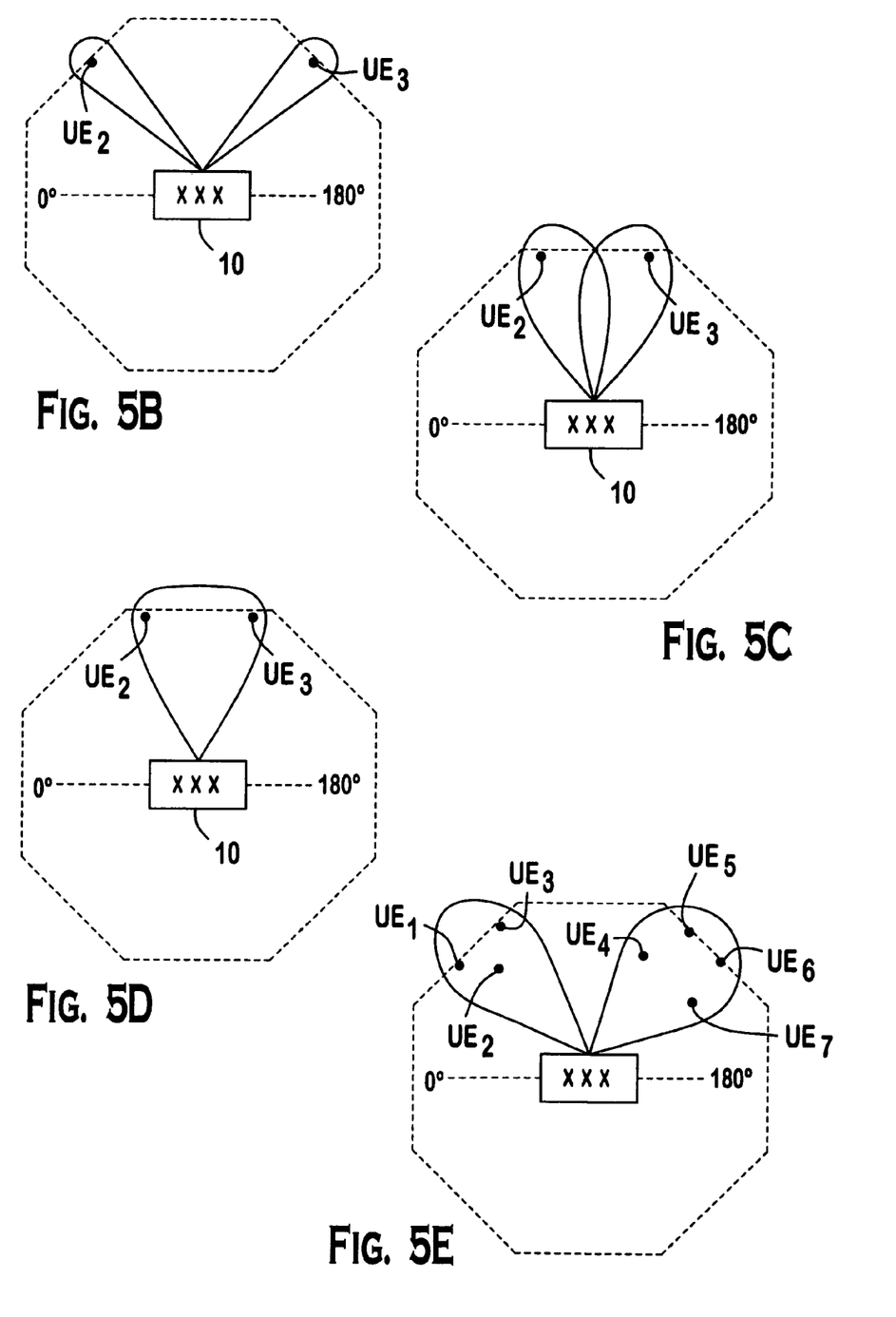

FIGS. 5B through 5D illustrate various scenarios. In FIG. 5B, $UE_2$ and $UE_3$ are sufficiently far apart that a beam formed on each of the UEs from base station antenna array 10 is of benefit. In transmission, the beam directed to $UE_2$ is far removed form the beam directed to $UE_3$. Thus, neither provides significant interference to reduce the respective SNR of the received signals.

In FIG. 5C the beams have significant overlap, indicating the respective signals present significant interference to each other. At either $UE_2$ and $UE_3$, the other's transmission will appear as a significant noise factors. In FIG. 5D, the same two UEs, $UE_2$ and $UE_3$, are illustrated at the same locations as covered by a single wide beam. The signal to each UE sees one less interferer since there is no second signal to the other UE thereby improving the denominator of the signal to interference ratio. If the power reaching the UEs is maintained constant, the selection of a mode parameter M reflecting a wide beam shape is made to improve SNR over the alternative illustrated in FIG. 5C.

In actual application, other variables can come into play. Power limitations in the transmitter or potential interference some distance away might actually require a lower power reaching the UEs during transmission from the base station, and an increase in noise from other sources due to the broadened beam could occur. In particular, where the beams of two or more adjacent base stations are being determined for cell reallocation, the power and shape of the beams to be transmitted by adjacent cells is preferably taken into account in determining an appropriate set of beams for the base stations involved in the process.

Additionally, the type of communication can be considered since different types of communications have different data rate and quality of service requirements. For example, data file transfers may be performed at a relatively low rate, but can require a high quality of service since every bit of a computer data program file must normally be correct in order for the transferred program file to operate correctly. Voice or video conferencing, can have a lower quality of service requirement, but may require a higher data rate so that the voice or video conference can appear to the user as being conducted in real time without interruption. Music or video streaming communications can have similar quality of service and data rate requirements for down link, but may be very asymmetrical with respect to uplink requirements. Accordingly, due to asymmetric data rate and quality of service requirements for two separate communications between base station 10 and, respectively, $UE_2$ and $UE_3$, FIG. 5C could represent the selectively formed downlink transmission beams from base station 10 to $UE_2$ and $UE_3$ and FIG. 5D could represent the selectively formed uplink reception beam for base station 10 for those communications.

If the data rate using one beam is not adequate to support both UEs requirements, it may be necessary to change the modulation format (rate, bits per symbol, etc.) to be able to use one beam. Such changes are likely to degrade the signal value in the numerator. Accordingly, the geolocation processor of the base station preferably makes comparative calculations to determine whether the better situation involves one or two beams and the required power for such beams. The beam pattern providing the best signals based on SNR are then preferably implemented. It is possible to extend the calculations to include the potential of rotating the beams from directly focusing them on the UEs, since the increased separation while somewhat detrimental to the denominator, may be more significant in the numerator.

FIG. 5E illustrates the cases of an increased number of UEs, $UE_1$ through $UE_7$. For ease of calculation, the UEs can be identified according to their angular polar coordinate such that for all $UE_i$ represented by $(\theta_i, d_i)$ and $UE_{i+1}$ represented by $(\theta_{i+1}, d_{i+1})$, $\theta_i \leq \theta_{i+1}$. For any number N of UEs, the beam forming selection process can then search for the two greatest values of $(\theta_i - \theta_{i+1})$, i.e. $\Delta\theta_{i,i+1}$, including $\Delta\theta_{N,1}$, to determine two groups of UEs which are closest together in angular orientation relative to the base station antenna array 10. FIG. 5E represents the situation where the angular difference between $UE_7$ and $UE_1$ ($\Delta\theta_{7,1}$) and the angular difference between $UE_3$ and $UE_4$ ($\Delta\theta_{3,4}$) are greatest so $UE_1$ through $UE_3$, and UEs, $UE_4$ through $UE_7$ are initially selected for grouping.

$\theta_{beam}$ for each of two proposed beam allocations can then initially be selected to bisect the end UEs angular orientation of each of the two groups. In the FIG. 5E situation, $\theta_{beam}$ for the first proposed beam allocation would preferably be initialized as $(\theta_1+\theta_3)\div2$ and $\theta_{beam}$ for the second proposed beam allocation would preferably be initialized as $(\theta_4+\theta_7)\div2$.

M is then selected to assure a wide enough beam to cover the angular spread between the end UEs of each group and P is selected to assure the signal projected distance is sufficient to cover the distant reflected in each the UE's distance coordinate d in the respective UE group. Calculations for other groupings can be made to determine if SNR improves on a systematic basis such that failure to provide improvement results in termination of the type of grouping variation being attempted. Where the antenna array provides a bidirectional symmetric beam as discussed above, the above calculations can be modified based on the absolute value of the relative angular location $\theta$ of each of the UEs which would be converted to the range $-180° \leq \theta \leq 180°$.

Figure 8:
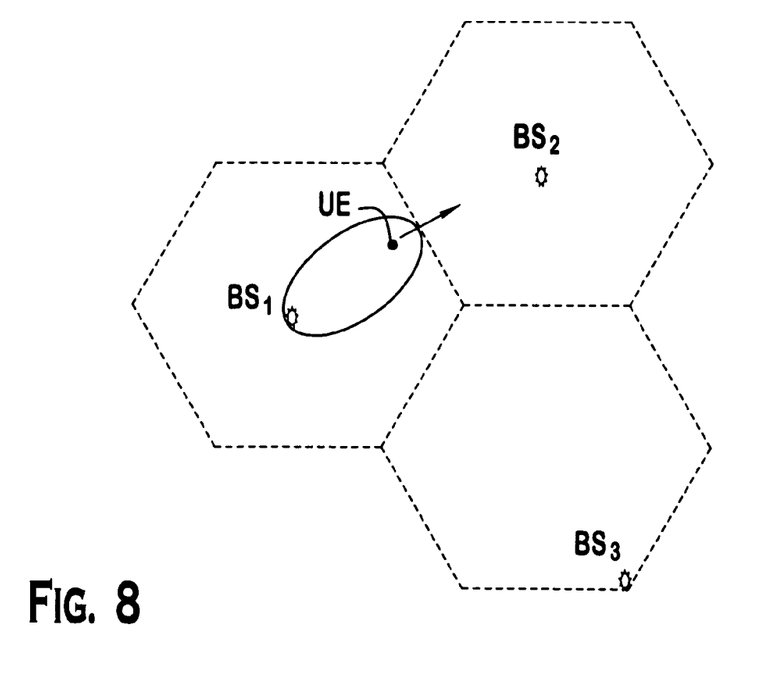
FIG. 8 illustrated a handover scenario as a UE moves from one cell to another.

Dynamic beam forming can also be advantageously employed in implementing handover of on-going communications. In order for a UE communication to be in progress, the UE has established an RF link between itself and a base station antenna system which may be located on a cell tower. As the UE moves, the characteristics of the RF link change and the received signal quality at UE and/or the cell tower may be reduced, causing a handover consideration process to be triggered. FIG. 8 illustrates a UE conducting a communication with a base station $BS_1$ in one cell and moving toward an adjacent cell which is serviced by a different base station $BS_2$.

Figure 9:
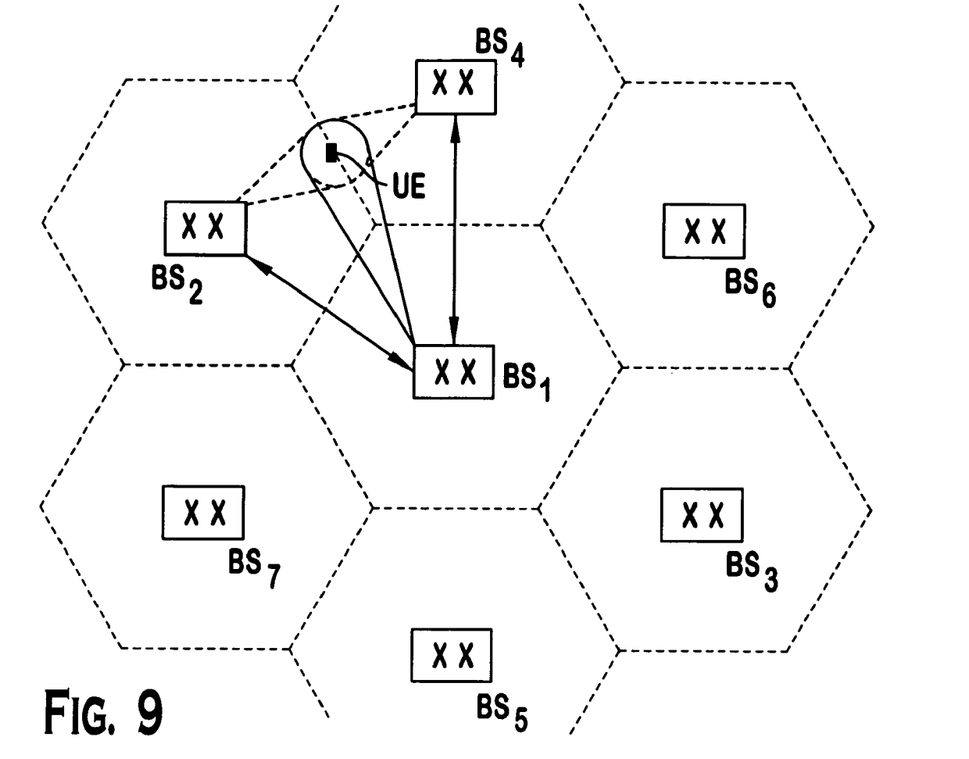
FIG. 9 depicts the negotiation process among the cooperating base stations for smart handover.

The handover consideration process involves the UE and a number of candidate target cells, one of which is then selected for the handover, if performed. FIG. 9 illustrates the negotiation process among cooperating base stations to make smart handover decisions. During this handover consideration process, each of the candidate cells communicate among themselves and exchange information regarding the availability of RF resources and any other considerations relevant to supporting the UE under consideration. Since the beams of two or more adjacent base stations are being determined for cell reallocation, the power and shape of the beams to be transmitted by adjacent cells is preferably taken into account in determining an appropriate set of beams for the base stations involved in the process. The negotiation process employs beam forming selection based on UE geolocation data as described above. The result of the negotiation is a determination of a selected set of beams for the involved base stations providing UE coverage with a relatively low SNR.

Figure 10:
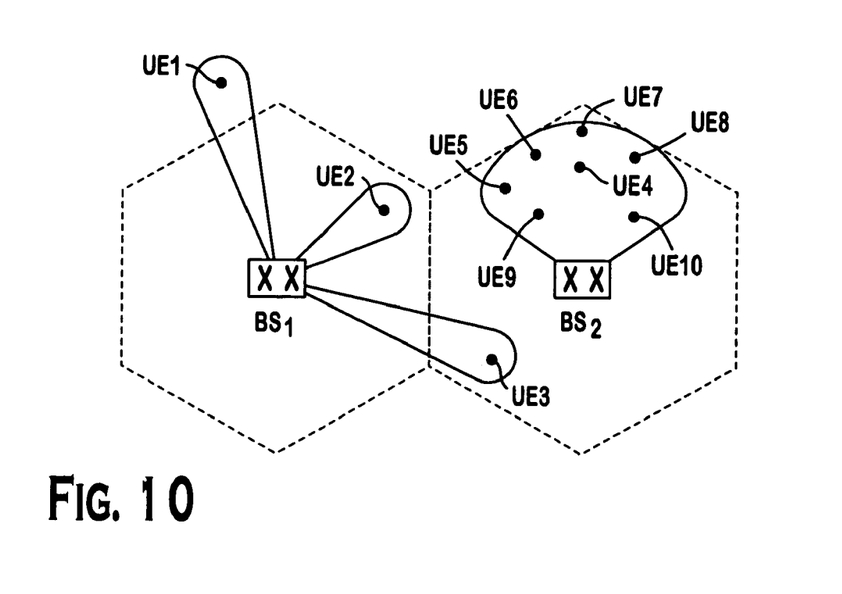
FIG. 10 illustrates user equipment supported via beam forming base stations using smart handover in accordance with the teachings of the present invention.

During this negotiation phase, the UE continues to be supported by the original cell tower, using tracking and focused beams by virtue of its antenna array. As such, the handover consideration process is not necessarily subject to tight timing restrictions. As illustrated in FIG. 10, in the extreme case, if a neighboring cell is not able to efficiently accept the UE, it may be determined that the original cell is best situated and should continue to serve the UE. This is done by beam forming and tracking abilities of the antenna array of, for example, base station $BS_1$ to continue to maintain the communications with $UE_1$ and $UE_3$, even though they have traveled beyond normal cell coverage of $BS_1$. In the example illustrated in FIG. 10, a high concentration of users proximate base station $BS_2$ has resulted in the "smart" handover determination to reconfigure an extended beam from base station $BS_1$ to continue service for $UE_3$.

Figure 11:
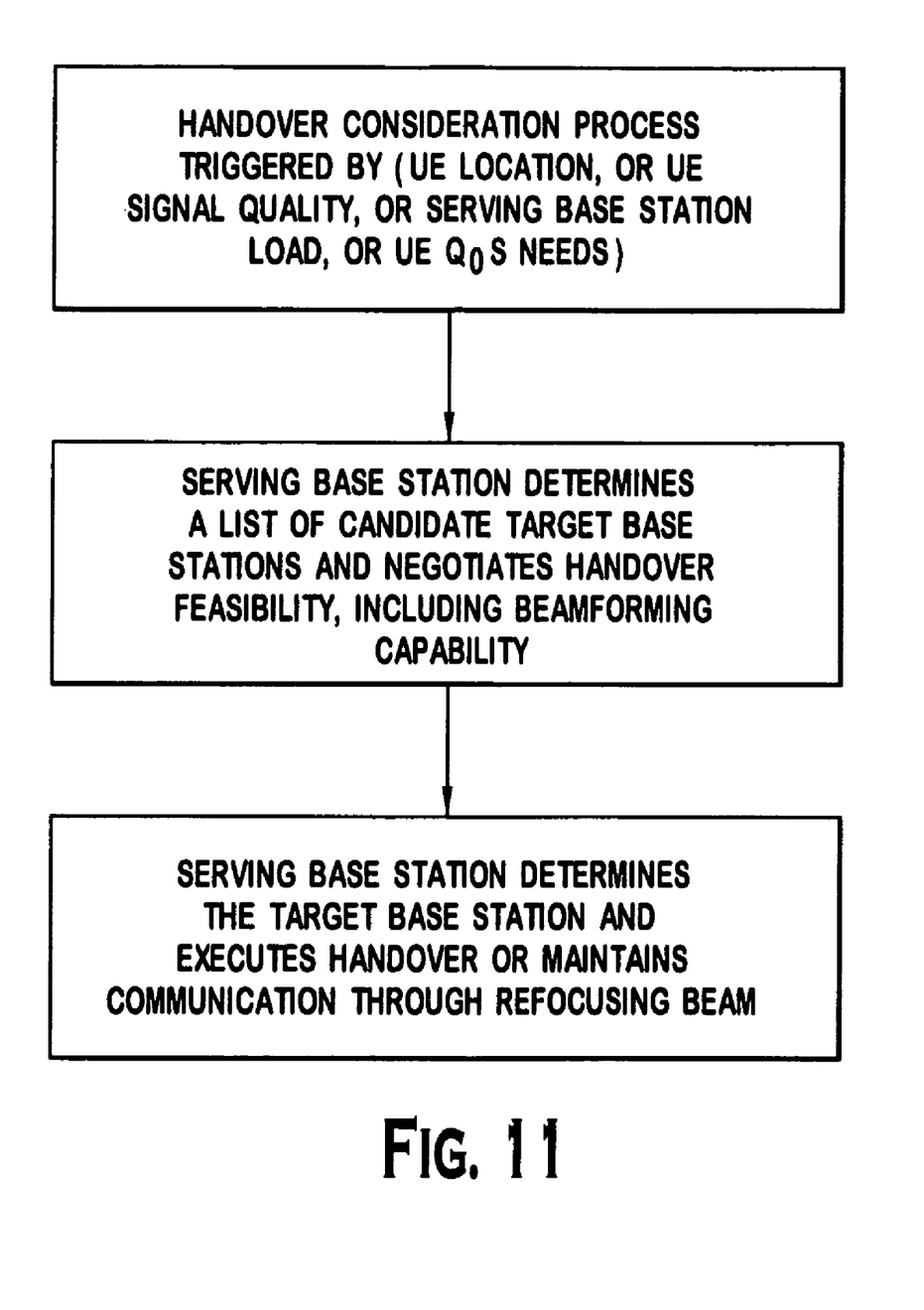
FIG. 11 is a flow chart depicting the steps for smart handover with beam forming base stations.

FIG. 11 is a flow chart of general process for conducting "smart" handover, which may actually result in no handover being made. The first step is to trigger the smart handover process through the occurrence of a triggering event. The triggering event preferably includes thresholds relating to UE location data, change of location data that indicates travel direction, UE signal quality deterioration, serving base station load and changes in service needs of the UE which may switch from a low to a high data rate during a communication as required by an underlying communication application.

Once the process is triggered, the serving base station determines which base stations are to be involved and proceeds with the negotiation process to selected a preferred beam allocation pattern for all of the involved base stations. Once the new beam allocation process is selected it is implemented to refocus the respective base station beams. Where a handover is to occur, the new serving based station will first implement the selected beams determined for it and acquire the UE communication, before the original serving base station implements its new beam pattern.

Where both smart handover and overall network dynamic shaping of cell coverage are employed, the smart handover criteria can merely serve as a triggering event for the dynamic shaping of cell coverage process illustrated in FIG. 4.

While the invention is described in terms of certain specific parameters, other variations will be readily apparent to those skilled in the art and are considered to be within the scope of the invention.

What is claimed is:

1. A method of selectively directing base station radio frequency (RF) communication signals comprising:
    determining an estimated geographic location of a user equipment (UE);
    determining relative location data using the estimated geographic location of the UE and a known geographic location of a base station antenna system;
    calculating beam forming criteria based in part on the relative location data, wherein the beam forming criteria include beam size and direction, and wherein calculating beam forming criteria is further based on relative location data of at least one other base station in a geographic area of the UE in order to minimize interference; and
    forming a directed and shaped beam for RF communication signals from the base station antenna system based on the calculated beam forming criteria such that the directed beam is selectively sized and directed to encompass the estimated location of the UE.

2. The method according to claim 1 wherein the determining an estimated geographic location of a UE is performed by telecommunication system triangulation of UE transmitted signals received by one or more base stations.

3. The method according to claim 1 wherein the determining an estimated geographic location of a UE includes receiving geographic location data at the base station.

4. The method according to claim 3 wherein the geographic location data includes Global Positioning Satellite system location data.

5. The method according to claim 1 wherein the determining an estimated geographic location of a UE is performed by telecommunication system triangulation of UE transmitted signals received by one or more base stations in conjunction with receiving Global Positioning Satellite (GPS) system data from the UE at a base station.

6. The method according to claim 1 wherein:
    the calculating beam forming criteria includes calculating transmission beam forming criteria; and
    forming a directed and shaped beam includes transmitting base station RF communication signals from the base station antenna system based on the calculated transmission beam forming criteria such that the directed and shaped beam is selectively sized and directed to encompass the estimated location of the UE.

7. A base station for conducting wireless radio frequency (RF) communications comprising:
    an RF module and an associated antenna array system;
    a beam former operatively associated with the RF module to form a desired beam within a range of beams of which the antenna array system is capable; and
    a geolocation processor coupled to the beam former that is configured to process estimated UE geolocation data and to calculate relative location data relative to a location of the antenna array system and output selected parameters to the beam former such that the beam former controls the RF module to transmit or receive communication data for a selected UE in a directed and shaped beam that is selectively sized and directed to encompass an estimated location of the selected UE and considers relative location data of at least one other base station in a geographic area of the UE in order to minimize interference.

8. The base station according to claim 7 wherein:
    the RF module has the capacity to provide more than one transmission beam such that each transmission beam is capable of carrying communication signals for a separate set of UEs; and
    the beam former is operatively associated with the RF module to form a set of desired transmission beams within a range of transmission beams which the antenna array system is capable of producing.

9. The base station according to claim 8 wherein the geolocation processor is configured to calculate reception beam forming parameters by estimating an area of reception beam coverage as a function of RF phase such that phase is selected so the relative location data of the selected UE is within the area of reception beam coverage.

* * * * *